US010785705B1

(12) United States Patent
Rofougaran et al.

(10) Patent No.: US 10,785,705 B1
(45) Date of Patent: Sep. 22, 2020

(54) LOW-POWER AND LOW-LATENCY NON-STANDALONE INITIAL ACCESS TO NEW RADIO CARRIER

(71) Applicant: Movandi Corporation, Newport Beach, CA (US)

(72) Inventors: Ahmadreza Rofougaran, Newport Beach, CA (US); Sam Gharavi, Irvine, CA (US); Maryam Rofougaran, Rancho Palos Verdes, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 0 days.

(21) Appl. No.: 16/398,216

(22) Filed: Apr. 29, 2019

(51) Int. Cl.
*H04W 48/08* (2009.01)
*H04L 5/00* (2006.01)
*H04B 7/155* (2006.01)
*H04W 72/08* (2009.01)
*H04W 56/00* (2009.01)
*H04W 72/04* (2009.01)

(52) U.S. Cl.
CPC ........ *H04W 48/08* (2013.01); *H04B 7/15528* (2013.01); *H04L 5/0032* (2013.01); *H04W 56/001* (2013.01); *H04W 72/048* (2013.01); *H04W 72/085* (2013.01)

(58) Field of Classification Search
CPC . H04W 48/08; H04W 56/001; H04W 72/048; H04W 72/085; H04B 7/15528; H04L 5/0032
See application file for complete search history.

(56) References Cited

U.S. PATENT DOCUMENTS

| | | | |
|---|---|---|---|
| 10,608,729 B1* | 3/2020 | Youtz | H04B 7/14 |
| 2019/0053175 A1* | 2/2019 | Kubota | H04W 16/14 |
| 2019/0141754 A1* | 5/2019 | Bai | H04L 27/2607 |
| 2020/0053792 A1* | 2/2020 | Ryu | H04L 5/0048 |
| 2020/0076518 A1* | 3/2020 | Patel | H04W 48/12 |
| 2020/0120724 A1* | 4/2020 | Vaidya | H04W 24/10 |

* cited by examiner

*Primary Examiner* — Mehmood B. Khan
(74) *Attorney, Agent, or Firm* — Chip Law Group

(57) ABSTRACT

A communication device that establishes a short-range wireless communication link with a fixed wireless access (FWA) user equipment (UE) or a mobile UE that is in a specified proximal range of the communication device. The FWA UE or the mobile UE is in a radio resource control (RRC) connected state over LTE network, is determined. The communication device detects whether a first new radio (NR) carrier is assigned to the FWA UE or the mobile UE without using the communication device. A carrier measurement is determined for NR is established at the FWA UE (or mobile UE) by an LTE-enabled base station in the RRC connected state. The communication device controls assignment of a second NR carrier to the FWA UE or the mobile UE for non-standalone initial access to a beam of RF data signals in the second NR carrier at the FWA UE or the mobile UE.

20 Claims, 6 Drawing Sheets

LOW-POWER AND LOW-LATENCY NON-STANDALONE INITIAL ACCESS TO NEW RADIO CARRIER

CROSS-REFERENCE TO RELATED APPLICATIONS/INCORPORATION BY REFERENCE

None.

FIELD OF TECHNOLOGY

Certain embodiments of the disclosure relate to a communication device in a wireless telecommunication system. More specifically, certain embodiments of the disclosure relate to a communication device and method for low-power and low-latency non-standalone initial access to next (5th) generation (5G) new radio carrier.

BACKGROUND 5G is the next generation of wireless telecommunication technology that delivers much faster data rate as compared to long term evolution (LTE or 4G) technology. Currently, there are two solutions proposed for 5G networks, known as Non-Standalone (NSA) and standalone (SA). In the Non-Standalone (NSA), the 5G networks will be supported by existing LTE infrastructure. In the early stages of transition to 5G network, 5G cells may be partially deployed leading to incomplete or partial 5G coverage. Thus, the 5G network needs to be interworked with the existing LTE network to provide a viable solution before a complete migration occurs to a full scale or true 5G core network services. Evolved-Universal Terrestrial Radio Access (E-UTRA) New Radio (NR)-Dual Connectivity (EN-DC) is a technology that enables introduction of 5G services and data rates in a predominantly LTE network. Devices, such as fixed wireless access user equipment or customer premise equipment, supporting EN-DC may connect simultaneously to LTE base station (i.e., eNB) and 5G-NR base station (i.e., gNB). The EN-DC supports 5G new radio (NR), which is a radio access technology that is flexible to support a much wider range of frequency bands from sub-6 GHz to millimeter wave (mm-Wave) bands. The EN-DC capable communication devices, also known as 5G-ready devices may enable usage of 5G services without the expense of the true 5G core network.

Initial access is the process which allows a device to first connect to a cellular network. The development of methods and systems for the initial access to NSA 5G NR carrier for EN-DC capable devices are still at nascent stage of research and development for practical applications. There are certain existing initial access procedures proposed for NSA 5G NR implementation, which are complicated and time consuming, for example, as a result of the use of extensive cell (base station) search and/or beam search operations in the initial access procedure.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication device and method for low-power and low-latency non-standalone initial access to 5G NR carrier, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a communication device and method for low-power and low-latency NSA initial access to 5G NR carrier. Existing initial access procedures typically include two main steps, cell (or base station) search on the downlink and random access (RA) on the uplink. 5G NR-based systems or communication devices typically rely on directional beamforming in order to create a viable connection. The beamforming direction may be required to be learned and may be used in the IA process, which is more complicated relative to communication systems operating at lower carrier frequencies.

Compared with fiber-to-the-home, other wireline or wireless solutions, and with 10 to 100 times more capacity than 4G networks, the disclosed communication device is cost-effective and easy-to-use because of the ability to provide low-power and low-latency NSA initial access to 5G NR carrier. The disclosed communication device further acts as a repeater equipment, which can facilitate significantly faster 5G FWA service rollout, cost-efficient NSA EN-DC 5G NR FWA deployments on a massive scale with lower operating cost. Further in certain scenarios, a 5G-ready device, such as a fixed wireless access (FWA) user equipment (UE) or a mobile UE, may be situated at a distance which is beyond transmission range of a base station, and hence reception of the RF signal at the FWA UE or the mobile UE may be adversely affected. Lack of refraction and diffraction in high radio frequencies also limits availability of links to line-of-sight (LOS) path or strong mirror-like reflective paths. This may be a constraint to deliver 5G NR wireless connections that are to be made available anywhere and anytime. In other scenarios one or more obstructions (such as buildings and hills) in path of the RF beam transmitted by the base station, may be blocking reception of the RF signal at the FWA UE (or the mobile UE). The high radio frequencies, such as the 5G NR, may demonstrate high transmittance losses when propagating through typical signal-obstructing physical objects or materials, such as tinted glass, wood, drywall, other glasses etc., when compared to sub-6 GHz radio signals. This may be a constraint for consistent availability of 5G NR connections, anywhere and anytime that may be desirable. The disclosed communication device acts as a repeater device or a relay node that that not only mitigates, for example, the aforementioned challenges, but also provides a low-power and a low-latency beam search and initial access solution to NSA 5G NR network for EN-DC 5G-NR devices (e.g., 5G-ready devices). In the following description, reference is made to the accompanying drawings, which form a part hereof, and in which is shown, by way of illustration, various embodiments of the present disclosure.

Figure 1:
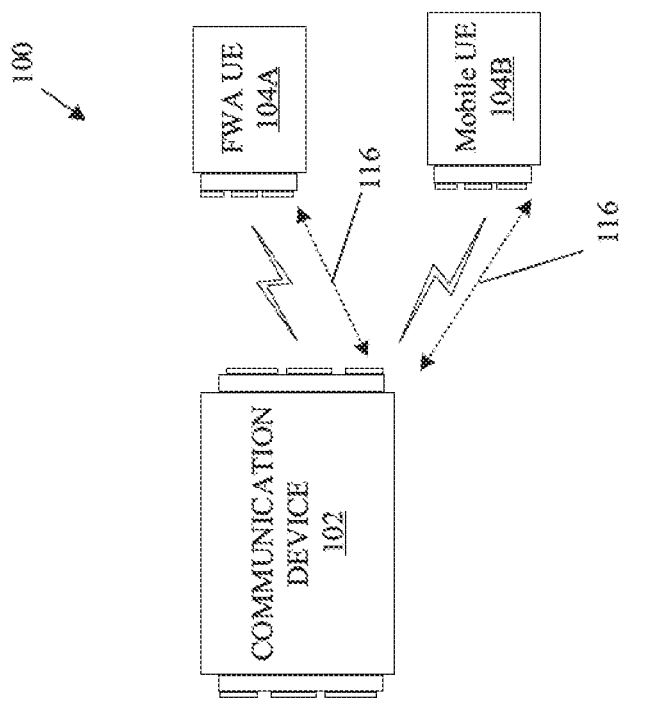
FIG. 1 is a network environment diagram that illustrates an exemplary communication device for low-power and low-latency non-standalone (NSA) initial access to 5G NR carrier, in accordance with an exemplary embodiment of the disclosure.
Figure 1:
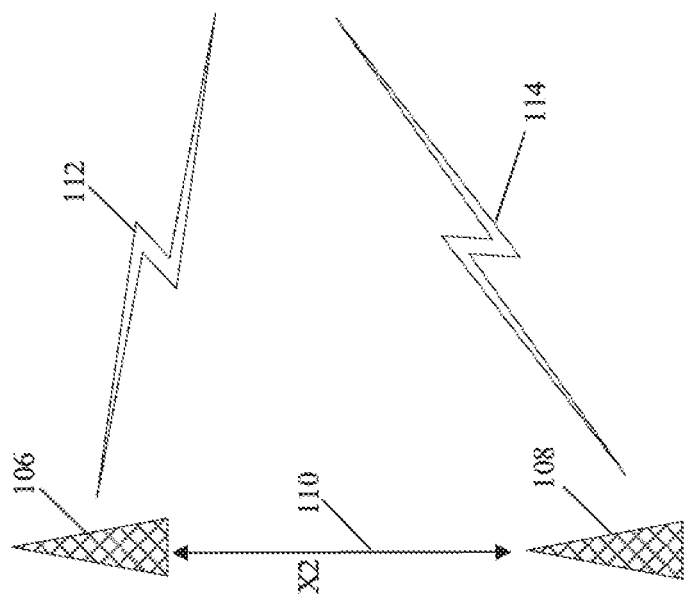

FIG. 1 is a network environment diagram that illustrates an exemplary communication device for low-power and low-latency non-standalone (NSA) initial access to 5G NR carrier, in accordance with an exemplary embodiment of the disclosure. With reference to FIG. 1, there is shown a network environment diagram 100 that may include a communication device 102, a fixed wireless access (FWA) user equipment (UE) 104A, a mobile UE 104B, a first base station 106, and a second base station 108. There is further shown a X2 interface 110 that enables communication between the first base station 106 (e.g., an eNB) and the second base station 108 (e.g., a gNB). The network environment diagram 100 depicts an exemplary EN-DC network (or NSA) architecture including the communication device 102. There is further shown a Long-term Evolution (LTE) network 112 and a 5G NR network 114.

The communication device 102 may be a NR-enabled relay node or a NR-enabled active repeater device. The NR-enabled relay node or the NR-enabled active repeater device may support an evolved-universal terrestrial radio access (E-UTRA)-NR dual connectivity (EN-DC) (also referred to as LTE/NR dual connectivity. In accordance with an embodiment, the communication device 102 may support multiple and a wide range of frequency spectrum, such as 3G, 4G, or 5G NR. For 5G NR, there may be two NR frequency Ranges (frequency range 1 and 2) that may be utilized for practical implementations. Frequency range 1 may overlap and extend 4G LTE frequencies, operating from 450 MHz to 6,000 MHz, which is also commonly referred to as NR or sub-6 gigahertz (GHz). Frequency range 2 operates at a much higher about 24 GHz to 52 GHz, which is commonly also referred to as millimeter wave (mmWave), although 'millimeter' frequency length typically begins at 30 GHz.

The communication device 102 may comprise suitable logic, circuitry, and interfaces that may be configured to facilitate communication between the FWA UE 104A (or the mobile UE 104B) and at least the second base station 108 (i.e. a gNB). In certain scenarios, the communication device 102 may be positioned in a vicinity of a signal-obstructing physical object, which may partially block the path of the input RF signals from the first base station 106 or the second base station 108. The communication device 102 may be realized by various components, such as transmitter front-ends, receiver front-ends, a digital signal processor, a plurality of low-noise amplifiers, a plurality of phase shifters, a plurality of power combiners, a plurality of power dividers, and a plurality of power amplifiers, logical control units, 4G and/or 5G modems, phased lock loop (PLL) circuits, and mixers.

The first base station 106 may be an LTE eNB and the second base station 108 may be a NR-enabled base station (i.e., a gNB). In accordance with an embodiment, the first base station 106 (i.e., the eNB) may act as a master node (MeNB) and the second base station 108 (i.e., the gNB or the 5G NR-enabled base station) may operate as a secondary node. In the EN-DC, for the data plane, both the first base station 106 (MeNB) and the second base station 108 (i.e., gNB) may have a direct interface with LTE core network (e.g. serving gateway (S-GW), not shown). However, for the control plane, only the first base station 106 (MeNB) may have a direct interface with LTE core network (such as mobility management entity (MME). Multiple base stations corresponding to one service provider, may be geographically positioned to cover specific geographical areas. Typically, bandwidth requirements serve as a guideline for a location of a base station based on relative distance between the one or more remote UEs, such as the FWA UE 104A (or the mobile UE 104B) and the first base station 106 or the second base station 108. The count of base stations may be dependent on, for example, population density and geographic irregularities, such as buildings and mountain ranges, which may interfere with beams of RF signals. The communication device 102 may be deployed between a base station (e.g. the first base station 106 and the second base station 108) and the one or more remote telecommunication equipment, such as the FWA UE 104A (or the mobile UE 104B) to mitigate lack of LOS between at least one base station, such as the first base station 106 or the second base station 108, and the one or more remote telecommunication equipment, such as the FWA UE 104A (or the mobile UE 104B).

The FWA UE 104A may be an EN-DC capable telecommunication hardware located at the customer's premises (certain physical location of user) rather than on the service provider's premises, or in between. In other words, the FWA UE 104A may be equipped with dual radios with both receiver (RX) and transmitter (TX), thus allowing it to be fully connected to both the first base station 106 (e.g., MeNB) and the second base station 108 (e.g., the gNB), The FWA UE 104A may be configured to establish a short-range communication link with the communication device 102. Examples of the FWA UE 104A may include, but are not limited to a wireless modem, a home router, a cable or satellite television set-top box, a VoIP base station, an EN-DC capable smartphone, an FWA equipment, or any other customized hardware for telecommunication.

The mobile UE 104B refers to a telecommunication hardware used by an end-user to communicate. Alternatively stated, the mobile UE 104B may refer a combination of mobile device and subscriber identity module (SIM). Examples of the mobile UE 104B may include, but are not limited to a smartphone, a mobile communication equipment, or any other customized hardware for telecommunication.

In accordance with an embodiment, the X2 interface 110 may be an over the air communication interface between the first base station 106 (master node or LTE MeNB) and the second base station 108 (e.g. secondary Node or 5G NR gNB) for EN-DC interworking. The X2 interface 110 may include control plane or signaling plane (X2-C) and user plane or data plane (X2-U). In accordance with an embodiment, the control plane may handle communication of system information and control of the FWA UE 104A (or the mobile UE 104B) connectivity, and the user plane may handle the FWA UE 104A (or the mobile UE 104B) specific data. For the data plane, both the first base station 106 (master node or LTE MeNB) and the second base station 108 (e.g., secondary Node or 5G NR gNB) may have a direct interface with LTE core network (i.e., serving gateway (S-GW)). However, for the control plane, only the first base station 106 (e.g., MeNB) may have a direct interface with the LTE core network (e.g., mobility management entity (MME)). In some embodiments, the X2-interface may be optional or may be replaced by some other suitable communication interface.

In the LTE network 112, the first base station 106 (e.g., the MeNB) may be responsible for maintenance of the RRC connections and control plane functions. In the NSA, the radio connection is anchored in LIE network 112 while 5G NR carriers of the 50 NR network 114 may be used to boost data-rates. The communication device 102 provides low-latency initial access to 5G NR network 114 in NSA mode.

The short-range wireless communication link 116 may be a wireless channel between the FWA UE 104A (or the mobile UE 104B) and the communication device 102. The short-range wireless communication link 116 may be established by a short-range wireless communication protocol or network. Examples of the short-range wireless communication network may include, but are not be limited to, a Wireless-Fidelity based network, a Light-Fidelity (Li-Fi) based network, a wireless personal area network (WPAN) such as a Bluetooth network, Internet-of-Things (IoT) network, Machine-Type-Communication (MTC) network, and/ or a Wi-Max based network.

In operation, the communication device 102 may be configured to receive initiate beam acquisition in a receive-only mode. The receive-only mode may also be referred to as downlink-only mode, in which a further communication (or relay) of input RF signals received at the communication device 102 from the base stations (such as the first base station 106 or the second base station 108) is deactivated. Alternatively stated, the received input RF signals are not further transmitted to the FWA UE 104A (or the mobile UE 104B).

The communication device 102 may be further configured to establish a short-range wireless communication link with the FWA UE 104A (or the mobile UE 104B) that is in a specified proximal range of the communication device 102. The communication device 102 may be further configured to acquire control information of one or more signal synchronization blocks (SSBs) from the FWA UE 104A (or the mobile UE 104B) over the established short-range wireless communication link 116. Alternatively, the control information may be acquired directly from the first base station 106 over an LTE control plane link. The acquired control information of one or more SSBs indicates a set of potential carrier frequencies shared via the LTE network 112. It is known that the LTE control plane handles communication of system information and control of the FWA UE 104A (or the mobile UE 104B) connectivity. It is further known that the control plane deals with signaling and control function, while a user plane deals with actual user data transmission. Example of such signaling and control functions in the LTE control plane includes security control, authentication, setting up of bearers, mobility management, Radio Resource Control (RRC), EUTRAN signaling, and Non-Access-Stratum (NAS) signaling known in the art.

The communication device 102 may be further configured to determine that the FWA UE 104A (or the mobile UE 104B) is in a radio resource control (RRC) connected state over the LTE network 112, based on the established short-range wireless communication link 116. Alternatively, the determination that the FWA UE 104A (or the mobile UE 104B) is in the RRC connected state is based on the control information acquired directly from the first base station 106 over the LTE control plane link or over the established short-range wireless communication link 116.

The communication device 102 may be further configured to detect whether a first NR carrier is assigned to the FWA UE 104A (or the mobile UE 104B) independent of use of the communication device 102 for the NR carrier assignment. The detection of whether the first NR carrier is assigned to the FWA UE 104A (or the mobile UE 104B) or not is based on the established short-range wireless communication link 116. Alternatively, the detection whether the first NR carrier is assigned FWA UE 104A (or the mobile UE 104B) without the use of the communication device 102 is executed based on the control information acquired directly from the first base station 106 over the LTE control plane link or over the established short-range wireless communication link 116.

The communication device 102 may be further configured to determine that a carrier measurement for NR is established at the FWA UE 104A (or the mobile UE 104B) by the first base station 106 (i.e. LTE-enabled base station) in the RRC connected state, based on the acquired control information over the LTE control plane link or over the established short-range wireless communication link 116. Such determination is executed either in an absence of the assignment of the first NR carrier to the FWA UE or when the received signal characteristic associated with the assigned first NR carrier is less than a signal quality threshold. The carrier measurement for NR may be for inter radio access technology (IRAT) when the FWA UE 104A (or the mobile UE 104B) is active in one radio access technology that corresponds to the LTE network 112. The carrier measurement for NR may be scheduled by the first base station 106 (i.e. LTE-enabled base station) when the FWA UE 104A (or the mobile UE 104B) is in the RRC connected state over the LTE network 112. The FWA UE 104A (or the mobile UE 104B) is configured to report the carrier measurement for NR to the first base station 106 (i.e. the LTE-enabled base station). In accordance with an embodiment, the carrier measurement for NR may be a B1 NR measurement. The B1 NR measurement indicates at least a reference signal received power (RSRP) at the FWA UE 104A (or the mobile UE 104B) in the RRC connected state over the LTE network 112. The B1 NR measurement may indicate whether the RSRP measured at the FWA UE 104A (or the mobile UE 104B) is greater than the signal quality threshold to potentially establish a 5G NR connection.

The communication device 102 may be further configured to control assignment of a second NR carrier, having the received signal characteristic greater than the signal quality threshold, to the FWA UE 104A (or the mobile UE 104B) for non-standalone initial access to a beam of RF data signals in the second NR carrier at the FWA UE 104A (or the mobile UE 104B). The beam of RF data signals in the second NR carrier is further communicated (or relayed), by the communication device 102, from the second base station 108 (i.e. a NR-enabled base station) to the FWA UE 104A (or the mobile UE 104B) for the assignment of the second NR carrier at the FWA UE 104A (or the mobile UE 104B) based on at least the determination that the carrier measurement for NR is established at the FWA UE 104A (or the mobile UE 104B).

Figure 2:
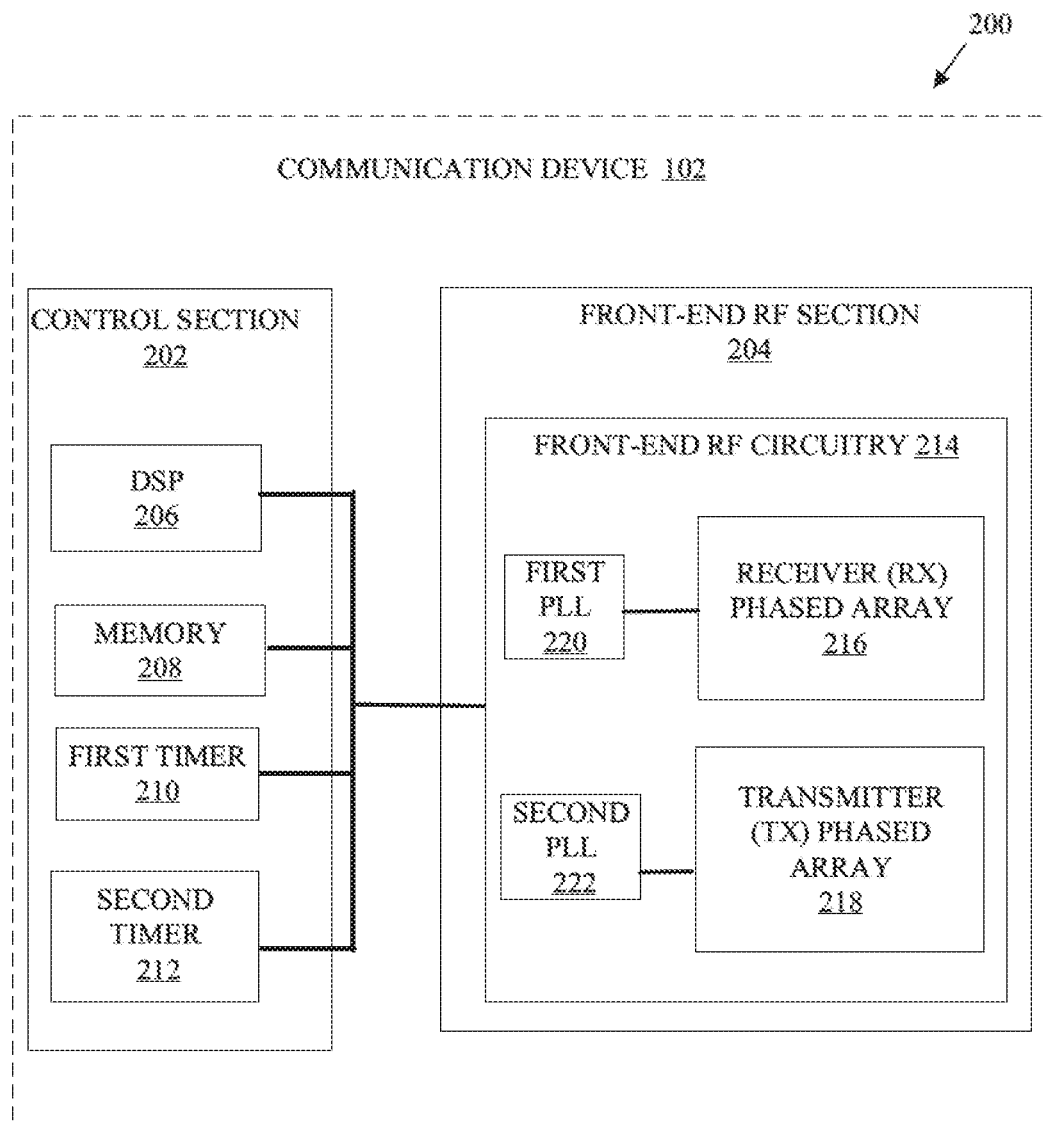
FIG. 2 is a block diagram illustrating various components of an exemplary communication device for low-power and low-latency NSA initial access to 5G NR carrier, in accordance with an exemplary embodiment of the disclosure.
Figure 3:
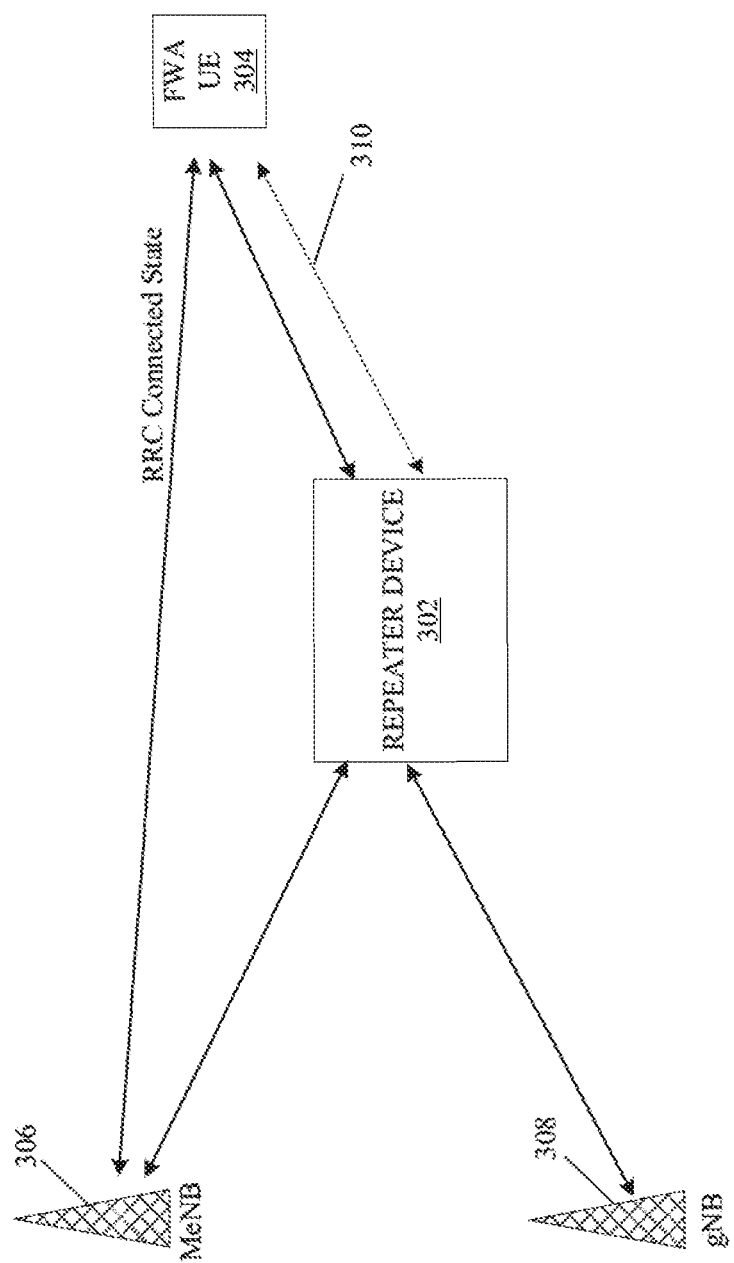
FIG. 3 illustrates an exemplary scenario for implementation of the communication device of FIG. 2 as a repeater equipment for low-power and low-latency NSA initial access to 5G NR carrier, in accordance with an embodiment of the disclosure.

FIG. 2 is a block diagram illustrating various components of an exemplary communication device for low-power and low-latency NSA initial access to 5G NR carrier, in accordance with an exemplary embodiment of the disclosure. FIG. 2 is explained in conjunction with elements from FIG. 1. With reference to FIG. 3, there is shown a block diagram 200 of the communication device 102. The communication device 102 may include a control section 202 and a front-end radio frequency (RF) section 204. The control section 202 may control the initial access to the 5G NR network 114 in NSA mode. The control section 202 may include a digital signal processor (DSP) 206, a memory 208, a first timer 210, and a second timer 212. The control section 202 may be communicatively coupled to the front-end RF section 204. The front-end RF section 204 may include front-end RF circuitry 214. The front-end RF circuitry 214 may further include a front-end receiver circuit, such as a receiver (Rx) phased array 216, and a front-end transmitter circuit, such as a transmitter (Tx) phased array 218. The front-end RF circuitry 214 may further include a first PLL 220 communicatively coupled to the receiver (Rx) phased array 216. Similarly, a second PLL 222 may be communicatively coupled to the Tx phased array 218.

The DSP 206 may be configured to control the front-end RF circuitry 214. The DSP 206 may be configured to activate or deactivate a receive-only mode at the communication device 102. The DSP 206 may be configured to initiate beam acquisition, by use of the front-end RF circuitry 214, in the receive-only mode, where in the receive-only mode, a further communication (or a further relay when the communication device 102 is a relay node) of input RF signals is deactivated. For example, the front-end transmitter circuit, such as the Tx phased array 218 may be switched OFF in the receive-only mode while the front-end receiver circuit, such as the Rx phased array 216 is ON. The communication device 102 may be a programmable device, where the DSP 206 may execute instructions stored in the memory 208. Example of the implementation of the DSP 206 may include, but are not limited to an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the DSP 206. The memory 208 may be further configured to store decoded physical cell identities (PCIs) of one or more beams that has the highest received signal strength or received signal strength greater than the threshold signal strength value. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The first timer 210 and the second timer 212 may be configured to maintain a clock to schedule specified tasks, time specified events, or count specified events. For example, during PSS search for each SSB location at the communication device 102, a PSS time out duration may be specified for one SSB location at the first timer 210. In a case where PSS is not detected for an SSB location, the DSP 206 may be configured to determine whether the current time taken for PSS search is less than the specified PSS timeout duration. In a case where, the time taken for PSS search is less than the specified PSS timeout duration for a currently searched SSB location, the DSP 206 continues to search for the PSS, or else moves to a PSS search for the next SSB location (i.e., for next SSB frequency or next carrier frequency). Similarly, the second timer 212 may be utilized to manage time to decode PCI associated with the plurality of beams of RF signals received at the communication device 102. It is to be understood by a person having ordinary skill in the art that the control section 202 may further include one or more other components, such as analog to digital converters (ADCs), a 5G NR digital modem circuitry, digital to analog circuitry (DAC), a LTE modem, and the like, known in the art, which are omitted for brevity.

The front-end RF circuitry 214 may include the Rx phased array 216 and the Tx phased array 218. The Rx phased array 216 may be configured to receive a plurality of different beams of RF signals (omnidirectional beams) from a plurality of different directions in an omni mode. The DSP 206 may be configured to control radio signals reception by setting the omni mode at the Rx phased array 216. In accordance with an embodiment, the Rx phased array 216 may include a cascading receiver chain comprising various components (e.g., an antenna array, a set of low noise amplifiers (LNA), a set of receiver front end phase shifters, and a set of power combiners) for the beam reception (not shown for brevity). Similarly, the TX phased array 218 may include a cascading transmitter chain comprising various components, such as a set of power dividers, a set of transmitter front end phase shifters, a set of power amplifiers (PA), and antenna array for beam transmission (not shown for brevity). In accordance with an embodiment, the Rx phased array 216 and the Tx phased array 218 may receive one or more beams of input RF signals and transmit the one or more beams of output RF signals in accordance with multiple-input multiple-output (MIMO) reception and transmission.

The first PLL 220 may be tuned, by the DSP 206, to radio burst of an SSB for each carrier frequency of a plurality of carrier frequencies for the PSS search. The tuning of the first PLL 220 may be done based on the received control information that indicates a set of potential carriers accessible at the FWA UE 104A (or the mobile UE 104B). In some embodiments, the tuning of the first PLL 220 may synchronize down conversion of received RF signals to the radio burst of SSB for each carrier frequency. The second PLL 222 may be a local oscillator similar to that of the first PLL 220 and may be associated with the Tx phased array 218 to facilitate up conversion of input baseband signals before transmission.

FIG. 3 illustrates an exemplary scenario for implementation of the communication device of FIG. 2 as a repeater equipment for low-power and low-latency NSA initial access to 5G NR carrier, in accordance with an embodiment of the disclosure. FIG. 3 is explained in conjunction with elements from FIGS. 1 and 2. With reference to FIG. 3, there is shown an exemplary NSA 5G NR network architecture which comprises a repeater device 302, a fixed wireless access (FWA) user equipment (UE) 304, an MeNB 306, and a gNB 308. The repeater device 302, the FWA UE 304, the MeNB 306, and the gNB 308 may correspond to the communication device 102, the FWA UE 104A (or the mobile UE 104B), the first base station 106, and the second base station 108 respectively (FIG. 1). There is further shown a short-range wireless communication link 310 between the repeater device 302 and the FWA UE 304. The short-range wireless communication link 310 may correspond to the short-range wireless communication link 116 of FIG. 1.

In the exemplary scenario, the repeater device 302 after installation at a defined fixed location (e.g. around a post or pillar), may be configured to cover a portion a 360-degree scan range or 360-degree scan range for communication among the MeNB 306, the gNB 308, and one or more remote UEs, such as the FWA UE 104A (or the mobile UE 104B). The FWA UE 304 may be in a radio resource control (RRC) connected state over an LTE network (e.g. the LTE network 112) before an initial access is granted to the non-standalone 5G NR network (such as the 5G NR network 114 (FIG. 1) for a dedicated connection state with the gNB 308 for high-speed data access.

In accordance with an embodiment, the DSP 206 may be further configured to initiate beam acquisition that denotes a start of initial access procedure. The beam acquisition may be initiated in a receive-only mode (i.e., downlink-only mode), in which a further communication of input RF signals received at the repeater device 302 is deactivated. The DSP 206 may be further configured to establish the short-range wireless communication link 310 with the FWA UE 304 that is in a specified proximal range of the repeater device 302.

The DSP 206 may be further configured to acquire control information of one or more SSBs from the FWA UE 304 over the established short-range wireless communication link 116. The acquired control information of one or more SSBs indicates a set of potential carrier frequencies shared via the LTE network 112. Various operations performed thereafter using the acquired control information saves time and processing resources at the communication device 102. The DSP 206 may be further configured to determine that the FWA UE 304 is in the RRC connected state over the LIE network 112, based on the established short-range wireless communication link 310. In cases where the FWA UE 304 is not in the RRC connected state over the LTE network 112, it indicates idle or inactive mode set at the FWA UP, 304.

The DSP 206 may be further configured to detect whether a first NR carrier is assigned to the FWA UE 304 independent of use of the repeater device 302 for the NR carrier assignment. In other words, it is determined whether the FWA UE 304 is connected to the gNB 308 on its own. The detection of whether the first NR carrier is assigned to the FWA UE 304 or not is based on the control information of one or more SSBs acquired by the established short-range wireless communication link 310.

The DSP 206 may be further configured to determine that a carrier measurement for NR is established at the EWA UE 304 by the MeNB 306 in the RRC connected state. Such determination is executed either in an absence of the assignment of the first NR carrier to the EWA UE or when the received signal characteristic associated with the assigned first NR carrier (when FWA UE 304 is connected on its own) is less than a signal quality threshold. In an example, the carrier measurement for NR may be a B1 NR measurement. The B1 NR measurement indicates RSRP at the FWA UE 304 in the RRC connected state over the LTE network 112. The B1 NR measurement may indicate whether the RSRP measured at the FWA UE 104A (or the mobile UE 104B) is greater than the signal quality threshold (e.g. signal-to-interference-plus-noise ratio (SINR)) to potentially establish a 5G NR connection.

The DSP 206 may be further configured to control radio signals reception by setting beam reception at the repeater device 302 to an omni mode in which a plurality of different beams of RF signals are receivable at the repeater device 302 from omni directions. Thus, there is no beamforming operations yet at the repeater device 302. Setting the beam reception at the repeater device 302 to the omni mode accelerates initial primary signal synchronization (PSS) search. The PSS that forms a first part of the SSB require only low signal to noise ratio (SNR) for PSS detection, thereby unwanted delay is avoided that could have been caused if any beamforming operations were done at this stage. Further, time taken to begin PSS search is significantly reduced as compared to conventional systems and methods of initial access.

Typically, the gNB 308 (i.e. 5G NR-enabled base station) periodically transmit SSBs carrying synchronization signals (e.g. PSS, secondary synchronization signal (SSS)) and broadcast channels (PBCH) by use of beam sweeping. One SS block may include 1 symbol PSS, 1 symbol SS and 2 symbols PBCH. SS burst (or the radio burst) may carry one or multiple SSBs. Typically, a combination of PSS and SSS helps to identify about 1008 PCI for a geographical area. In accordance with an embodiment, the DSP 206 may be further configured to tune the first PLL 220 to radio burst of SSB at each SSB location (i.e., each carrier frequency) of a plurality of carrier frequencies (i.e., SSB frequencies) for the PSS search, based on the received information of the one or more SSBs. The DSP 206 instructs the radio signal reception to tune to the carrier frequency offset.

In accordance with an embodiment, the DSP 206 may be further configured to execute a primary signal synchronization (PSS) search for each SSB location of a plurality of SSB locations based on the acquired information of the one or more SSBs over the established short-range wireless communication link 310. In some embodiments, the acquired information including the set of potential carriers may also include one carrier or multiple 5G NR carriers. The FWA UE 304 searches for SSBs for the carrier information. Each SSB location indicates a carrier frequency offset. The DSP 206 may be further configured to align a timing offset of the beam reception to a frame structure of a 5G NR radio frame based on the detected PSS for the at least one SSB location (e.g., a 5G NR carrier frequency). The detected PSS indicates a timing boundary of the 5G NR radio frame, and thus having the detected PSS can also align a 5G-ready device, such as the repeater device 302, for relay or its timing boundary with the frame structure of the 5G NR radio frame.

In accordance with an embodiment, the DSP 206 may be further configured to execute a beam measurement and ranking operation for a plurality of different beams of RF signals that are received at the repeater device 302. In the beam measurement and ranking operation, the received plurality of different beams of RF signals are sorted in terms of received signal strength indicator (RSSI) measurement associated with each beam of the received plurality of different beams of RF signals.

In an example, in the beam measurement and ranking operation, firstly, the DSP 206 may be configured to measure RSSI for each beam of the plurality of different beams of RF signals for each SSB location of the plurality of SSB locations in accordance with PSS timing after the PSS is detected. Secondly, the DSP 206 may be further configured to sort the received plurality of different beams of RF signals that are received at the repeater device 302 based on the measured received signal strength for each beam of the plurality of different beams. For example, from the beam having the highest RSSI, next highest RSSI beam, . . . , to beam having lowest RSSI.

The DSP 206 may be further configured to switch to a specific beam of RF signals in the 5G NR frequency that has a highest RSSI of the received plurality of different beams for the beam reception (Rx). Concurrently, the same beam of RF signals that is switched to at the Rx phased array 216 for reception (e.g. is processed for beamforming and then communicated or in some cases directly relayed) is further transmitted to the FWA UE 304 for non-standalone access.

The receive-only mode is deactivated, and further communication of the specific beam of RF signals in the 5G NR frequency is activated. The DSP 206 may be further configured to execute a beam lock for a first beam of RF signals of the plurality of different beams of RF signals that has the highest RSSI for beam reception at the repeater device 302 in a NR carrier frequency. The first beam of RF signals of the plurality of different beams of RF signals that has the highest RSSI is further beam locked for beam transmission to the FWA UE 304 from the repeater device 302. The first beam of RF signals that is beam locked corresponds to a second NR carrier, having the received signal characteristic greater than the signal quality threshold, which is assigned to the FWA UE 104A (or the mobile UE 104B) for non-standalone initial access at the FWA UE 104A (or the mobile UE 104B) based on at least the determination that the carrier measurement for NR is established at the FWA UE 104A (or the mobile UE 104B).

In accordance with an embodiment, the DSP 206 may be further configured to decode the physical cell identity (PCI) of the first beam of RF signals that has the highest received signal strength and a set of other beams of RF signals that has the received signal strength greater than a threshold signal strength value. For example, PCI for a defined number of sorted beams (e.g., first "M" number of beams that has high RSSI measurements) that has suitable RSSI, may be decoded. The DSP 206 may be further configured to store the decoded PCIs of the beam of RF signals that has the highest received signal strength and the set of other beams of RF signals that has the received signal strength greater than the threshold signal strength value, in the memory 208.

The DSP 206 may be further configured to acquire the PCI of a NR-enabled base station, such as the gNB 308, and additional carrier information (i.e. the assigned second carrier) from the FWA UE 304 over the established short-range wireless communication link 310. In accordance with an embodiment, the DSP 206 may be further configured to compare the PCI of the NR-enabled base station, such as the gNB 308, acquired from the FWA UE 104A (or the mobile UE 104B) with the stored PCIs at the repeater device 302. The DSP 206 may be further configured to validate and confirm the beam acquisition at the FWA UE 304 for the non-standalone access to the first beam of RF signals in the second NR carrier (i.e. NR frequency) as successful. The confirmation may be done based on a match of the PCI of the NR-enabled base station, such as the gNB 308, acquired from the FWA UE 304 with the PCI associated (stored and decoded PCI) with the specific beam of RF signals that has the highest RSSI. The confirmation indicates success of the initial access of the FWA UE 304 to 5G N R network 114 in NSA mode. The FWA UE 304 may be concurrently connected to the MeNB 306 and the gNB 308 in the non-standalone (NSA) 5G NR mode for the enhanced data-rates. Alternatively stated, in the NSA, the radio connection is anchored in the LTE network while 5G NR carriers are used to boost data-rates. The initial access between the 5G-ready or 5G-capable device, for example, the FWA UE 304 and the NR-enabled base station (e.g., the gNB 308) helps or assists with initial connection to the 5G NR network 114 and to perform synchronization with the 5G-NR network 114 very quickly and reliably as compared to conventional systems and methods.

In accordance with an embodiment, the DSP 206 may be further configured to initiate an uplink communication by application of beam reciprocity to the communicated beam of RF signals in the second NR carrier. The DSP 206 may be further configured to acquire Time Division Duplex (TDD) configuration information from the FWA UE 304 over the established short-range wireless communication link 116, and accordingly start TDD switching in the NR frequency in the 5G NR network 114.

Figure 4A:
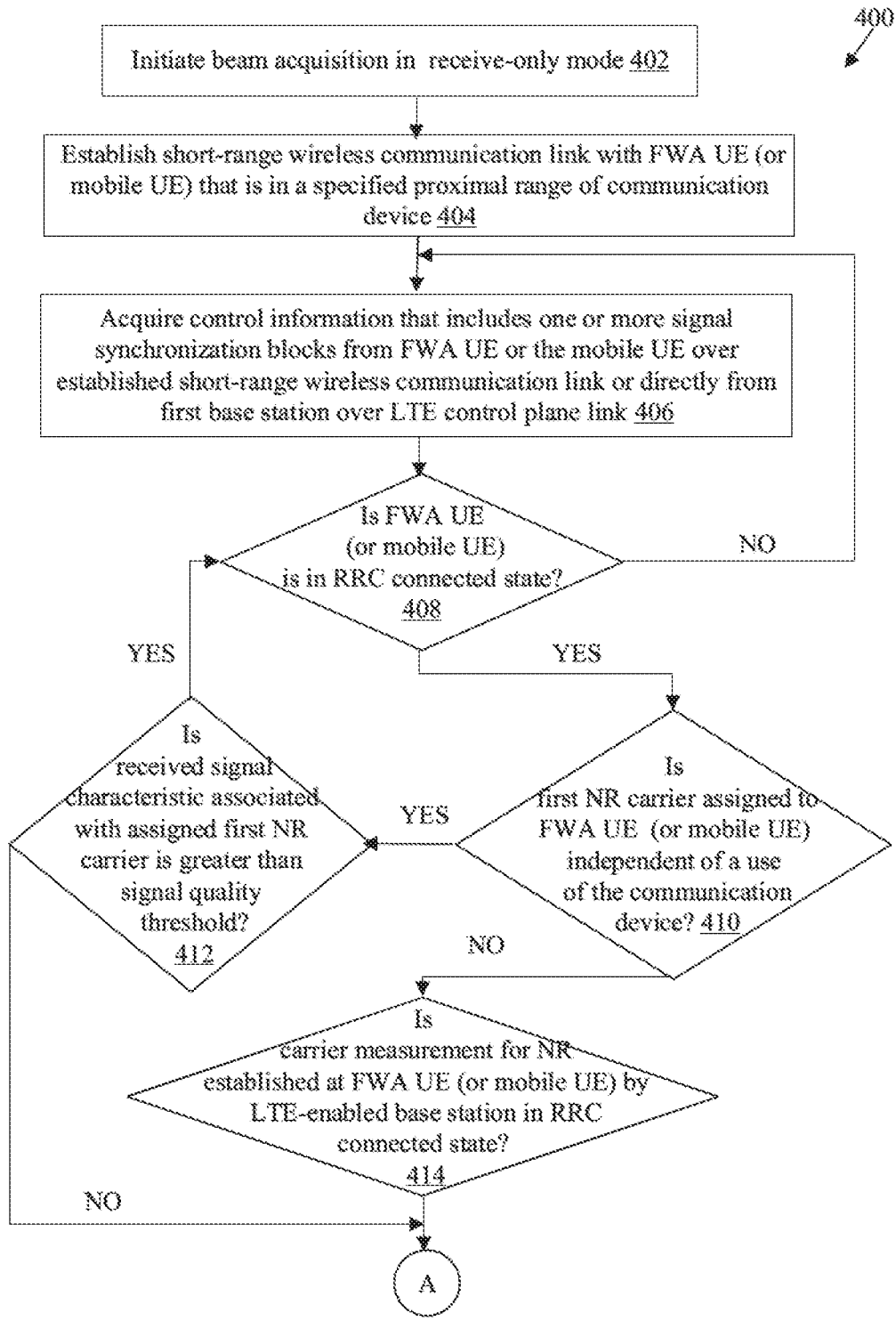
FIGS. 4A, 4B, and 4C collectively, depict a flow chart that illustrates an exemplary method for low-power and low-latency NSA initial access to 5G NR carrier, in accordance with an embodiment of the disclosure.
Figure 4B:
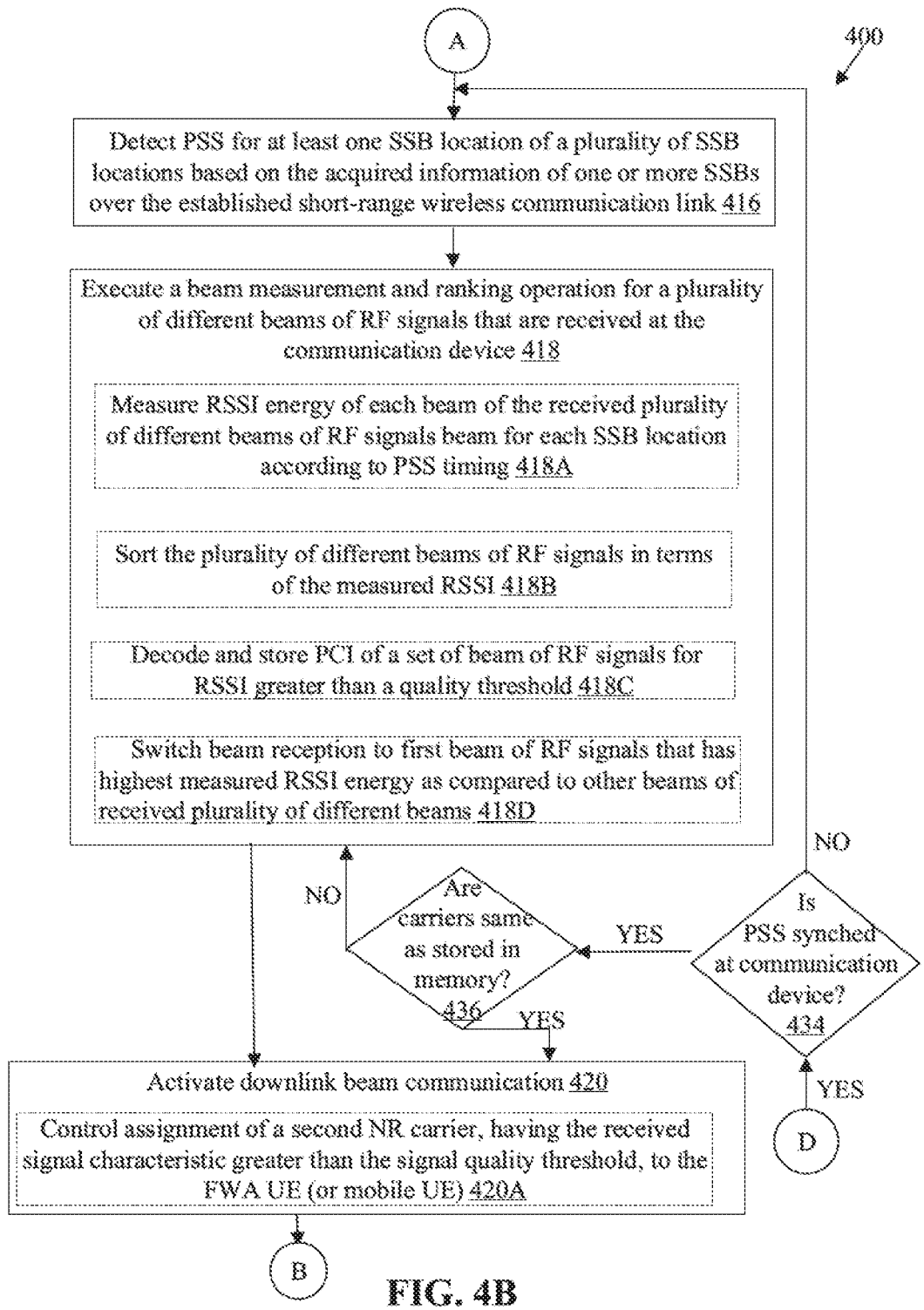
Figure 4C:
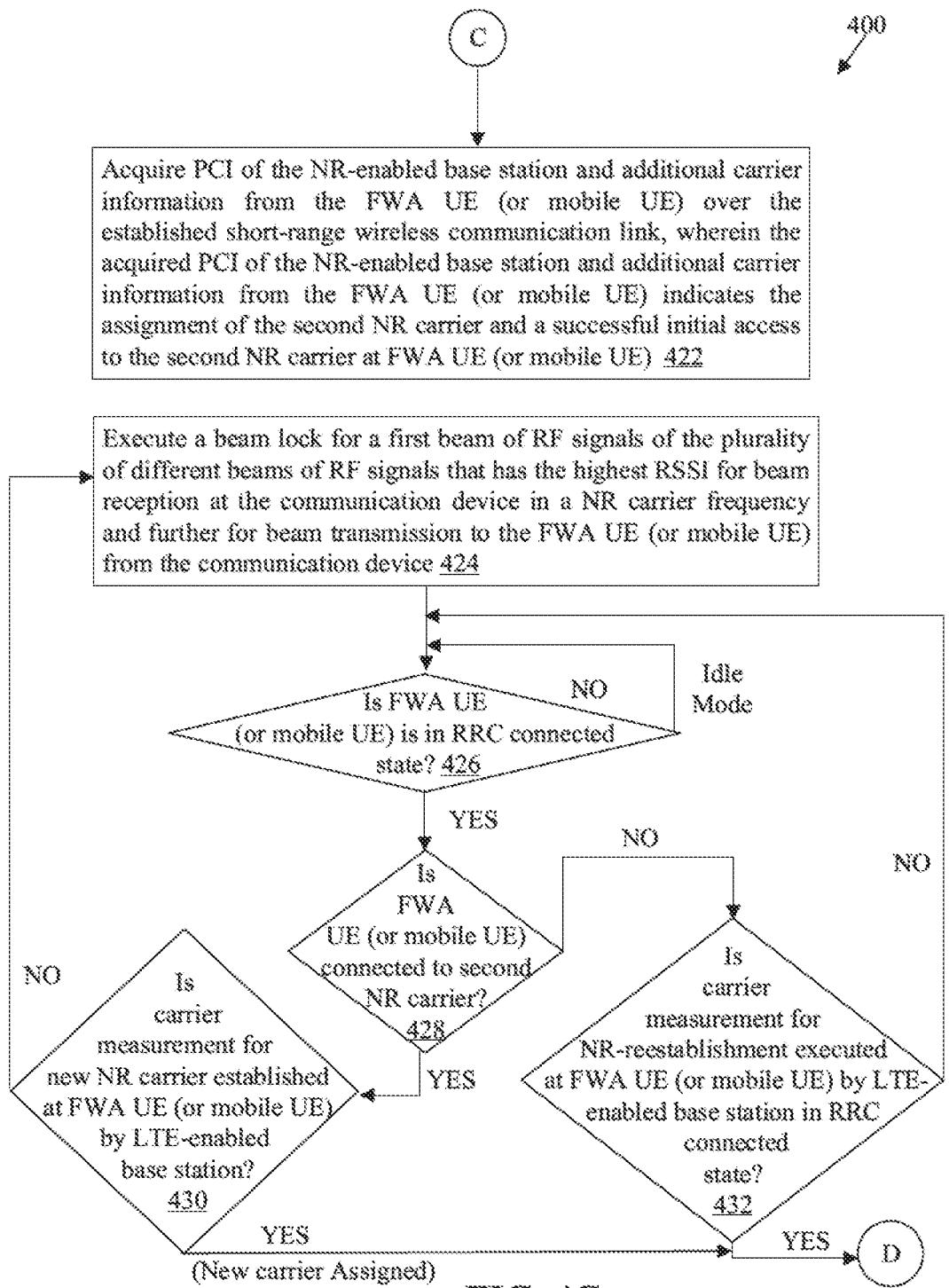

FIGS. 4A, 4B, and 4C collectively, depict a flow chart that illustrates an exemplary method for low-power and low-latency NSA initial access to 5G NR carrier, in accordance with an embodiment of the disclosure. FIGS. 4A, 4B, and 4C are explained in conjunction with elements from FIGS. 1, 2, and 3. With reference to FIGS. 4A to 4C, there is shown a flow chart 400 comprising exemplary operations 402 through 436 by the communication device 102.

At 402, beam acquisition may be initiated in receive-only mode at the communication device 102. The front-end RF circuitry 214 may be set to the receive-only mode, in which the Tx phased array 218 may be deactivated and thus a further communication of input RF signals is deactivated.

At 404, the short-range wireless communication link 116 (e.g., Bluetooth, Wi-Fi, Li-Fi, and the like) may be established with the FWA UE 104A (or the mobile UE 104B) that is in a specified proximal range of the communication device 404.

At 406, control information that includes one or more signal synchronization blocks may be acquired from the FWA UE 104A (or the mobile UE 104B) over the established short-range wireless communication link 116. Alternatively, the control information of one or more signal synchronization blocks may be acquired directly from the first base station 106 over an LTE control plane link. The acquired control information of one or more SSBs indicates a set of potential carrier frequencies shared via the LTE network 112.

At 408, it may be determined whether the FWA UE 104A (or the mobile UE 104B) is in a radio resource control (RRC) connected state based on the established short-range wireless communication link 116. Alternatively, in an embodiment, the determination of whether the FWA UE 104A (or the mobile UE 104B) is in the RRC connected state is based on the control information directly acquired from the first base station 106 over the LTE control plane link. In cases where the FWA UE 104A (or the mobile UE 104B) is in the RRC connected state, the control passes to 410, otherwise the control returns to 406.

At 410, it may be detected whether a first new radio (NR) carrier is assigned to the FWA UE 104A (or the mobile UE 104B) independent of use of the communication device 102 for the NR carrier assignment, based on the established short-range wireless communication link. Alternatively, in an embodiment, the detection of whether the first NR carrier is assigned to the FWA UE 104A (or the mobile UE 104B) is based on the control information directly acquired from the first base station 106 over the LTE control plane link. In cases where the first NR carrier is assigned to the FWA UE 104A (or the mobile UE 104B) on its own, i.e. without the use of the communication device 102, the control passes to 412, or else to 414.

At 412, it may be determined whether the received signal characteristic associated with the assigned first NR carrier is greater than a signal quality threshold (e.g., if the SINR at FWA UE 104A (or the mobile UE 104B) for the first NR carrier is greater than the signal quality threshold). In cases where the received signal characteristic associated with assigned first NR carrier is greater than the signal quality threshold, the control passes to 408, which indicates the FWA UE 104A (or the mobile UE 104B) is connected on its own to 5G NR and is receiving suitable signal quality and thus, there is no need for the communication device 102 for the FWA UE 104A (or the mobile UE 104B). In cases where the received signal characteristic associated with assigned first NR carrier is less than the signal quality threshold, the control passes to 416 (FIG. 4B).

At 414, it may be determined whether a carrier measurement for NR is established at the FWA UE 104A (or the mobile UE 104B) by an LTE-enabled base station (such as the first base station 106) in the RRC connected state. The carrier measurement for NR may be established based on the established short-range wireless communication link. Alternatively, in an embodiment, the determination whether the carrier measurement for the NR established at the FWA UE 104A (or the mobile UE 104B) by the LTE-enabled base station is based on the control information directly acquired from the first base station 106 over the LTE control plane link. In accordance with an embodiment, beam reception at the the front-end RF circuitry 214, such as at the Rx phased array 216, may be set to an omni mode in which a plurality of different beams of RF signals are receivable from omni directions. There may be no beamforming operations yet at the communication device 102. Setting the beam reception at the communication device 102 to the omni mode accelerates initial primary signal synchronization (PSS) search. The PSS that forms a first part of the SSB require only low signal to noise ratio (SNR) for PSS detection, thereby avoiding unwanted delay that could have been caused if any beamforming operations were done at this stage. Further, time taken to begin PSS search is significantly reduced as compared to conventional systems and methods of initial access.

At 416, a PSS may be detected for at least one SSB location of a plurality of SSB locations based on the acquired control information of one or more SSBs. In accordance with an embodiment, the first PLL 220 may be tuned to radio burst of each SSB for each carrier frequency of a plurality of carrier frequencies for the PSS search, based on the acquired control information. A timing offset of the beam reception is aligned to a frame structure of a 5G NR radio frame based on the detected PSS for the SSB location. The detected PSS indicates a timing boundary of the 5G NR radio frame.

At 418, a beam measurement and ranking operation is executed for a plurality of different beams of RF signals that are received at the communication device 102. In accordance with an embodiment, various operations 418A to 418D may be executed in the beam measurement and ranking operation. At 418A, RSSI energy of each beam of the received plurality of different beams of RF signals beam may be measured for each SSB location according to PSS timing of the detected PSS. The RSSI is a measure of power present in a received RF signal. The RSSI may provide useful information such as rough estimate of distance between transmitters of the RF signal from the communication device 102. Alternatively stated, a received signal strength may be measured for each beam of the plurality of different beams of RF signals for each SSB location of the plurality of SSB locations in accordance with the PSS timing of the detected PSS. At 418B, the plurality of different beams of RF signals may be sorted in terms of the measured RSSI. At 418C, physical cell identity (PCI) of a set of beam of RF signals may be decoded and stored for the RSSI greater than the signal quality threshold. At 418D, beam reception is switched to a first beam of RF signals that has the highest measured RSSI energy as compared to other beams of received plurality of different beams at the communication device 102.

At 420, downlink beam communication may be activated. At 420A, an assignment of a second NR carrier, having the received signal characteristic greater than the signal quality threshold, to the FWA UE 420A is controlled. The communication of the sorted first beam of RF signals in a NR frequency (i.e., the second NR carrier) that has the highest measured RSSI energy to the FWA UE 104A (or the mobile UE 104B) is activated.

At 422, a PCI of the NR-enabled base station (such as the first base station 106) and additional carrier information from the FWA UE 104A (or the mobile UE 104B), may be acquired. As the first sorted beam of RF signals in the second NR carrier that has the highest measured RSSI energy is previously communicated to the FWA UE 104A (or the mobile UE 104B), it is expected additional carrier information for the last communicated beam in the NR frequency is likely to be available at the FWA UE 104A (or the mobile UE 104B). Thus, the PCI of the NR-enabled base station and the additional carrier information is retrieved over the established short-range wireless communication link. The acquired PCI of the NR-enabled base station and additional carrier information from the FWA UE 104A (or the mobile UE 104B) indicates the assignment of the second NR carrier and a successful initial access to the second NR carrier at the FWA UE 104A (or the mobile UE 104B).

At 424, a beam lock is executed for the first beam of RF signals of the plurality of different beams of RF signals that has the highest RSSI for beam reception at the communication device 102 in a NR carrier frequency (i.e., the second NR carrier) and further for beam transmission to the FWA UE 104A (or the mobile UE 104B) from the communication device 102.

At 426, it may be determined whether the FWA UE 104A (or the mobile UE 104B) is in the RRC connected state. The determination may be performed continuously or periodically. In cases where the FWA UE 104A (or the mobile UE 104B) is in the RRC connected state, the control passes to 428, or else the control returns to 426 indicating an idle mode.

At 428, it is determined whether the FWA UE 104A (or the mobile UE 104B) is connected to the second NR carrier. In cases where the FWA UE 104A (or the mobile UE 104B) is connected to the second NR carrier, the control passes to 430, or else to 432.

At 430, it may be determined whether the carrier measurement is established for a new NR carrier (e.g., the second NR carrier) at the FWA UE 104A (or the mobile UE 104B) by the LTE-enabled base station (such as the first base station 106) in the RRC connected state. In cases where the carrier measurement is established for the new NR carrier (e.g., the second NR carrier) at the FWA UE 104A (or the mobile UE 104B), the control passes to 434 (FIG. 4B), or else returns to 424 (FIG. 4C).

At 432, it is further determined whether the carrier measurement is executed for NR-reestablishment at the FWA UE 104A (or the mobile UE 104B) by the LTE-enabled base station in the RRC connected state. In cases where the carrier measurement is executed for the NR-reestablishment at the FWA UE 104A (or the mobile UE 104B), the control passes to 434 (of FIG. 4B), or else the control returns to 426 (FIG. 4C).

At 434, it is determined whether the PSS is synched is at the communication device 102. In cases where the PSS is synched is at the communication device 102, the control passes to 436, or else the control returns to 416.

At 436, it is further determined whether the carriers are same as stored in the memory 208. In cases where the same carriers are stored in the memory 208 of the communication device 102, the control passes to 420, else to 416.

Various embodiments of the disclosure may provide a non-transitory computer-readable medium having stored thereon, computer implemented instructions that when executed by one or more circuits causes a device to execute operations to establish a short-range wireless communication link (e.g. the short-range wireless communication link 116) with the FWA UE 104A (or the mobile UE 104B) (FIG. 1) that is in a specified proximal range of the communication device. It may be determined that the FWA UE 104A (or the mobile UE 104B) is in a RRC connected state over a LTE network, based on the established short-range wireless communication link. It may be further detected whether a first NR carrier is assigned to the FWA UE independent of use of the communication device 102 for the NR carrier assignment, based on the established short-range wireless communication link. It is further determined that a carrier measurement for NR is established at the FWA UE 104A (or the mobile UE 104B) by a LTE-enabled base station (such as the first base station 106) in the RRC connected state, based on the established short-range wireless communication link and at least one of an absence of the assignment of the first NR carrier to the FWA UE 104A (or the mobile UE 104B) or a received signal characteristic associated with the assigned first NR carrier is less than a signal quality threshold. The assignment of a second NR carrier, having the received signal characteristic greater than the signal quality threshold, to the FWA UE 104A (or the mobile UE 104B) is controlled for non-standalone initial access to a beam of RF data signals in the second NR carrier at the FWA UE 104A (or the mobile UE 104B), where the beam of RF data signals in the second NR carrier is communicated (or relayed), by the communication device 104, from a NR-enabled base station (such as the second base station 108) to the FWA UE 104A (or the mobile UE 104B) for the assignment of the second NR carrier at the FWA UE 104A (or the mobile UE 104B) based on at least the determination that the carrier measurement for NR is established at the FWA UE 104A (or the mobile UE 104B).

Various embodiments of the disclosure may provide a system for low-latency initial access to non-standalone 5G NR network. The system may include the communication device 102 (FIG. 1) that comprises the front-end RF circuitry 214 (FIG. 2) and the DSP 206 (FIG. 2) that may be communicatively coupled to the front-end RF circuitry 214. The DSP 206 may be configured to establish a short-range wireless communication link (e.g. the short-range wireless communication link 116) with the FWA UE 104A (or the mobile UE 104B) (FIG. 1) that is in a specified proximal range of the communication device. The DSP 206 may be further configured to determine that the FWA UE 104A (or the mobile UE 104B) is in a RRC connected state over a LTE network, based on the established short-range wireless communication link. The DSP 206 may be further configured to detect whether a first NR carrier is assigned to the FWA UE independent of use of the communication device 102 for the NR carrier assignment, based on the established short-range wireless communication link. The DSP 206 may be further configured to determine that a carrier measurement for NR is established at the FWA UE 104A (or the mobile UE 104B) by a LTE-enabled base station (such as the first base station 106) in the RRC connected state, based on the established short-range wireless communication link and at least one of an absence of the assignment of the first NR carrier to the FWA UE 104A (or the mobile UE 104B) or a received signal characteristic associated with the assigned first NR carrier is less than a signal quality threshold. The DSP 206 may be further configured to control an assignment of a second NR carrier, having the received signal characteristic greater than the signal quality threshold, to the FWA UE 104A (or the mobile UE 104B) for non-standalone initial access to a beam of RF data signals in the second NR carrier at the FWA UE 104A (or the mobile UE 104B), where the beam of RF data signals in the second NR carrier may be communicated (or relayed), by the communication device 104, from a NR-enabled base station (such as the second base station 108) to the FWA UE 104A (or the mobile UE 104B) for the assignment of the second NR carrier at the FWA UE 104A (or the mobile UE 104B) based on at least the determination that the carrier measurement for NR is established at the FWA UE 104A (or the mobile UE 104B).

In accordance with an embodiment, the communication device 102 may be at least one of an evolved-universal terrestrial radio access-NR dual connectivity (EN-DC) device, a NR-enabled relay node, or a NR-enabled repeater device. The FWA UE 104A (or the mobile UE 104B) may be an EN-DC device. The carrier measurement for NR may be for inter radio access technology (IRAT) when the FWA UE 104A (or the mobile UE 104B) is active in one radio access technology that corresponds to the LTE network, wherein the carrier measurement for NR is scheduled by the LTE-enabled base station (i.e. the first base station 106) when the FWA UE 104A (or the mobile UE 104B) is in the RRC connected state over the LTE network 112, and wherein the FWA UE 104A (or the mobile UE 104B) is configured to report the carrier measurement for NR to the LTE-enabled base station. In accordance with an embodiment, the carrier measurement for NR may be a B1 NR measurement that indicates at least a reference signal received power (RSRP) at the FWA UE 104A (or the mobile UE 104B) in the RRC connected state over the LTE network 112, and whether the RSRP measured at the FWA UE 104A (or the mobile UE 104B) is greater than the signal quality threshold to potentially establish a fifth generation (5G) NR connection.

In accordance with an embodiment, the DSP 206 may be further configured to initiate beam acquisition, by use of the front-end RF circuitry 214, in a receive-only mode. In the receive-only mode, further communication (or relay) of input RF signals to the FWA UE 104A (or the mobile UE 104B) is deactivated. The DSP 206 may be further configured to acquire information of one or more signal synchronization blocks (SSBs) from the FWA UE 104A (or the mobile UE 104B) over the established short-range wireless communication link, where the acquired control information of one or more SSBs indicates a set of potential carrier frequencies shared via the LTE network 112.

In accordance with an embodiment, the DSP 206 may be further configured to detect a primary signal synchronization (PSS) for at least one SSB location of a plurality of SSB locations based on the acquired control information of one or more SSBs over the established short-range wireless communication link 116. The DSP 206 may be further configured to align a timing offset of the beam reception to a frame structure of a fifth generation (5G) NR radio frame based on the detected PSS for the at least one SSB location. The detected PSS indicates a timing boundary of the 5G NR radio frame.

In accordance with an embodiment, the DSP 206 may be further configured to execute a beam measurement and ranking operation for a plurality of different beams of RF signals that are received at the communication device 102. In the beam measurement and ranking operation, the received plurality of different beams of RF signals are sorted in terms of received signal strength indicator (RSSI) measurement associated with each beam of the received plurality of different beams of RF signals.

In accordance with an embodiment, the DSP 206 may be further configured to execute a beam lock for a first beam of RF signals of the plurality of different beams of RF signals that has the highest RSSI for beam reception at the communication device 102 in a NR carrier frequency and further for beam transmission to the FWA UE 104A (or the mobile UE 104B) from the communication device 102, where the non-standalone access to the beam of RF data signals in the second NR carrier at the FWA UE 104A (or the mobile UE 104B) corresponds to the first beam of RF signals in the beam lock.

In accordance with an embodiment, the DSP 206 may be further configured to acquire a physical cell identity (PCI) of the NR-enabled base station and additional carrier information from the FWA UE 104A (or the mobile UE 104B). The PCI of the NR-enabled base station and the additional carrier information is retrieved over the established short-range wireless communication link 116. The acquired PCI of the NR-enabled base station and additional carrier information from the FWA UE 104A (or the mobile UE 104B) indicates the assignment of the second NR carrier and a successful initial access to the second NR carrier at the FWA UE 104A (or the mobile UE 104B).

In accordance with an embodiment, the DSP 206 may be further configured to determine whether the LTE-enabled base station established the carrier measurement for NR for a new carrier that is the second NR carrier that has a highest received signal strength indicator (RSSI) at the FWA UE 104A (or the mobile UE 104B) from among a plurality of RSSIs associated with a plurality of different beams of RF signals received at the communication device 102, based on the acquired information of the one or more SSBs. The second NR carrier is assigned to the FWA UE based on the established carrier measurement for NR for the second NR carrier.

The DSP 206 may be further configured to validate the beam acquisition at the FWA UE 104A (or the mobile UE 104B) for the non-standalone access to the beam of RF signals in the NR frequency as successful based on a match of the acquired PCI of the NR-enabled base station and the PCI associated with the beam of RF signals that has the highest received signal strength. The DSP 206 may be further configured to initiate an uplink communication (e.g., from the FWA UE 104A (or the mobile UE 104B) to the second base station 108) by application of beam reciprocity to the communicated beam of RF signals in the NR frequency.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A communication device, comprising:
a digital signal processor configured to:
establish a short-range wireless communication link with a fixed wireless access (FWA) user equipment (UE) that is in a specified proximal range of the communication device;
determine that the FWA UE is in a radio resource control (RRC) connected state over a long-term evolution (LTE) network, based on the established short-range wireless communication link;
detect a first new radio (NR) carrier is assigned to the FWA UE independent of use of the communication device for the NR carrier assignment, based on the established short-range wireless communication link;
determine that a carrier measurement for NR is established at the FWA UE by a LTE-enabled base station in the RRC connected state, based on the established short-range wireless communication link and at least one of an absence of the assignment of the first NR carrier to the FWA UE or a received signal characteristic associated with the assigned first NR carrier is less than a signal quality threshold; and
control assignment of a second NR carrier, having the received signal characteristic greater than the signal quality threshold, to the FWA UE for non-standalone initial access to a beam of RF data signals in the second NR carrier at the FWA UE, wherein the beam of RF data signals in the second NR carrier is communicated, by the communication device, from a NR-enabled base station to the FWA UE for the assignment of the second NR carrier at the FWA UE based on at least the determination that the carrier measurement for NR is established at the FWA UE.

2. The communication device of claim 1, wherein the communication device is at least one of an evolved-universal terrestrial radio access-NR dual connectivity (EN-DC) device, a NR-enabled relay node, or a NR-enabled repeater device, and wherein the FWA UE is an EN-DC device.

3. The communication device of claim 1, wherein the carrier measurement for NR is for inter radio access technology (IRAT) when the FWA UE is active in one radio access technology that corresponds to the LTE network, wherein the carrier measurement for NR is scheduled by the LTE-enabled base station when the FWA UE is in the RRC connected state over the LTE network, and wherein the FWA UE is configured to report the carrier measurement for NR to the LTE-enabled base station.

4. The communication device of claim 1, wherein the carrier measurement for NR is a B1 NR measurement that indicates at least a reference signal received power (RSRP) at the FWA UE in the RRC connected state over the LTE network, and the RSRP measured at the FWA UE is greater than the signal quality threshold to potentially establish a fifth generation (5G) NR connection.

5. The communication device of claim 1, further comprising a front-end radio frequency (RF) circuitry,
wherein the digital signal processor is further configured to:
initiate beam acquisition, by use of the front-end RF circuitry, in a receive-only mode, wherein in the receive-only mode, a further relay of input RF signals to the FWA UE is deactivated; and
acquire information of one or more signal synchronization blocks (SSBs) from the FWA UE over the established short-range wireless communication link, wherein the acquired control information of one or more SSBs indicates a set of potential carrier frequencies shared via the LTE network.

6. The communication device of claim 5, wherein the digital signal processor is further configured to detect a primary signal synchronization (PSS) for at least one SSB location of a plurality of SSB locations based on the acquired control information of one or more SSBs over the established short-range wireless communication link.

7. The communication device of claim 6, wherein the digital signal processor is further configured to align a timing offset of a beam reception to a frame structure of a fifth generation (5G) NR radio frame based on the detected PSS for the at least one SSB location, wherein the detected PSS indicates a timing boundary of the 5G NR radio frame.

8. The communication device of claim 6, wherein the digital signal processor is further configured to execute a beam measurement and ranking operation for a plurality of different beams of RF signals that are received at the communication device,
wherein in the beam measurement and ranking operation, the received plurality of different beams of RF signals are sorted in terms of received signal strength indicator (RSSI) measurement associated with each beam of the received plurality of different beams of RF signals.

9. The communication device of claim 8, wherein the digital signal processor is further configured to execute a beam lock for a first beam of RF signals of the plurality of different beams of RF signals that has the highest RSSI for beam reception at the communication device in a NR carrier frequency and further for beam transmission to the FWA UE from the communication device, wherein the non-standalone access to the beam of RF data signals in the second NR carrier at the FWA UE corresponds to the first beam of RF signals in the beam lock.

10. The communication device of claim 9, wherein the digital signal processor is further configured to acquire a physical cell identity (PCI) of the NR-enabled base station and additional carrier information from the FWA UE, wherein the PCI of the NR-enabled base station and the additional carrier information is retrieved over the established short-range wireless communication link, and wherein the acquired PCI of the NR-enabled base station and additional carrier information from the FWA UE indicates the assignment of the second NR carrier and a successful initial access to the second NR carrier at the FWA UE.

11. The communication device of claim 1, wherein the digital signal processor is further configured to determine the LTE-enabled base station established the carrier measurement for NR for a new carrier that is the second NR carrier that has a highest received signal strength indicator (RSSI) at the FWA UE from among a plurality of RSSIs associated with a plurality of different beams of RF signals received at the communication device, based on the established short-range wireless communication link, wherein the second NR carrier is assigned to the FWA UE based on the established carrier measurement for NR for the second NR carrier.

12. A communication device, comprising:
a digital signal processor configured to:
establish a short-range wireless communication link with a fixed wireless access (FWA) user equipment (UE) or a mobile UE that is in a specified proximal range of the communication device;
acquire control information that includes one or more signal synchronization blocks (SSBs) directly from a first base station over a Long-term Evolution (LTE) control plane link or from the FWA UE or a mobile UE over the established short-range wireless communication link;
determine that the FWA UE or the mobile UE is in a radio resource control (RRC) connected state over a LTE network, based on the acquired control information;
detect a first new radio (NR) carrier is assigned to the FWA UE or the mobile UE independent of use of the communication device for the NR carrier assignment, based on the acquired control information;
determine that a carrier measurement for NR is established at the FWA UE or the mobile UE by a LTE-enabled base station in the RRC connected state, based on the acquired control information, and at least one of an absence of the assignment of the first NR carrier to the FWA UE or the mobile UE or a received signal characteristic associated with the assigned first NR carrier is less than a signal quality threshold; and
control assignment of a second NR carrier, having the received signal characteristic greater than the signal quality threshold, to the FWA UE or the mobile UE for non-standalone initial access to a beam of RF data signals in the second NR carrier at the FWA UE or the mobile UE, wherein the beam of RF data signals in the second NR carrier is communicated, by the communication device, from a NR-enabled base station to the FWA UE or the mobile UE for the assignment of the second NR carrier at the FWA UE or the mobile UE based on at least the determination that the carrier measurement for NR is established at the FWA UE or the mobile UE.

13. A method, comprising:
in a communication device that includes a digital signal processor (DSP):
establishing, by the DSP, a short-range wireless communication link with a fixed wireless access (FWA)

user equipment (UE) that is in a specified proximal range of the communication device;

acquire control information that includes one or more signal synchronization blocks (SSBs) directly from a first base station over a Long Term Evolution (LTE) control plane link or from the FWA UE or the mobile UE over the established short-range wireless communication link;

determining, by the DSP, that the FWA UE or the mobile UE is in a radio resource control (RRC) connected state over a LTE network, based on the acquired control information;

detecting, by the DSP, a first new radio (NR) carrier is assigned to the FWA UE or the mobile UE independent of use of the communication device for the NR carrier assignment, based on the acquired control information;

determining, by the DSP, that a carrier measurement for NR is established at the FWA UE or the mobile UE by a LTE-enabled base station in the RRC connected state, based on the acquired control information, and at least one of an absence of the assignment of the first NR carrier to the FWA UE or the mobile UE, or a received signal characteristic associated with the assigned first NR carrier is less than a signal quality threshold; and controlling, by the DSP, assignment of a second NR carrier, having the received signal characteristic greater than the signal quality threshold, to the FWA UE or the mobile UE for non-standalone initial access to a beam of RF data signals in the second NR carrier at the FWA UE or the mobile UE, wherein the beam of RF data signals in the second NR carrier is relayed, by the communication device, from a NR-enabled base station to the FWA UE or the mobile UE for the assignment of the second NR carrier at the FWA UE or the mobile UE based on at least the determination that the carrier measurement for NR is established at the FWA UE or the mobile UE.

14. The method of claim 13, wherein the carrier measurement for NR is for inter radio access technology (IRAT) when the FWA UE or the mobile UE is active in one radio access technology that corresponds to the LTE network, wherein the carrier measurement for NR is scheduled by the LTE-enabled base station when the FWA UE or the mobile UE is in the RRC connected state over the LTE network, and wherein the FWA UE or the mobile UE is configured to report the carrier measurement for NR to the LTE-enabled base station.

15. The method of claim 13, further comprising:
initiating, by the DSP, beam acquisition in a receive-only mode, wherein in the receive-only mode, a further relay of input RF signals to the FWA UE or the mobile UE is deactivated, wherein the acquired control information of one or more SSBs indicates a set of potential carrier frequencies shared via the LTE network.

16. The method of claim 15, further comprising detecting, by the DSP, a primary signal synchronization (PSS) for at least one SSB location of a plurality of SSB locations based on the acquired control information of one or more SSBs.

17. The method of claim 16, further comprising aligning, by the DSP, a timing offset of a beam reception to a frame structure of a fifth generation (5G) NR radio frame based on the detected PSS for the at least one SSB location, wherein the detected PSS indicates a timing boundary of the 5G NR radio frame.

18. The method of claim 16, further comprising executing, by the DSP, a beam measurement and ranking operation for a plurality of different beams of RF signals that are received at the communication device,
wherein in the beam measurement and ranking operation, the received plurality of different beams of RF signals are sorted in terms of received signal strength indicator (RSSI) measurement associated with each beam of the received plurality of different beams of RF signals.

19. The method of claim 18, further comprising executing, by the DSP, a beam lock for a first beam of RF signals of the plurality of different beams of RF signals that has the highest RSSI for beam reception at the communication device in a NR carrier frequency and further for beam transmission to the FWA UE or the mobile UE from the communication device, wherein the non-standalone access to the beam of RF data signals in the second NR carrier at the FWA UE or the mobile UE corresponds to the first beam of RF signals in the beam lock.

20. The method of claim 19, further comprising:
acquiring, by the DSP, a physical cell identity (PCI) of the NR-enabled base station and additional carrier information from the FWA UE or the mobile UE over the established short-range wireless communication link; and
utilizing, by the DSP, the acquired PCI of the NR-enabled base station and additional carrier information to validate the assignment and a successful initial access to the second NR carrier at the FWA UE or the mobile UE.

\* \* \* \* \*